United States Patent
Han et al.

(10) Patent No.: US 10,131,259 B1
(45) Date of Patent: Nov. 20, 2018

(54) ARMREST STRUCTURE FOR VEHICLE SEAT

(71) Applicant: DAE WON SAN UP CO., LTD., Ansan-si, Gyeonggi-do (KR)

(72) Inventors: Kug-Hun Han, Seoul (KR); Sang-Ho Kim, Incheon (KR); Soo-Hyun Moon, Hwaseong-si (KR); Young-Bok Sung, Hwaseong-si (KR); Jin-Hyung Kim, Ansan-si (KR); Jae-Myung Hur, Seoul (KR); Seok-Joo Kang, Ansan-si (KR)

(73) Assignee: DAE WON SAN UP CO., LTD., Ansan-si (KR)

( * ) Notice: Subject to any disclaimer, the term of this patent is extended or adjusted under 35 U.S.C. 154(b) by 0 days.

(21) Appl. No.: 15/650,325

(22) Filed: Jul. 14, 2017

(51) Int. Cl.
*A47C 7/54* (2006.01)
*B60N 2/75* (2018.01)
*B60N 2/427* (2006.01)
*B60N 2/42* (2006.01)

(52) U.S. Cl.
CPC .......... *B60N 2/753* (2018.02); *B60N 2/427* (2013.01); *B60N 2/4235* (2013.01); *B60N 2/75* (2018.02)

(58) Field of Classification Search
CPC .......... B60N 2/753; B60N 2/75; B60N 2/763; B60N 2/773; B60N 2/4235; B60N 2/427
USPC ............... 297/411.36, 411.2, 411.25, 411.32, 297/411.35, 411.37
See application file for complete search history.

(56) References Cited

U.S. PATENT DOCUMENTS

| | | | | | |
|---|---|---|---|---|---|
| 4,872,727 | A | * | 10/1989 | Rye | A47C 1/03 297/301.1 |
| 5,636,899 | A | * | 6/1997 | Schiff | B60N 2/77 297/411.36 |
| 6,386,636 | B2 | * | 5/2002 | Caruso | A47C 1/03 297/353 |
| 2003/0042782 | A1 | * | 3/2003 | Davis | A47C 7/54 297/411.35 |
| 2006/0290190 | A1 | * | 12/2006 | Zuccato | A47C 1/03 297/411.36 |
| 2013/0119738 | A1 | * | 5/2013 | Wallis | A47C 7/54 297/411.36 |
| 2014/0327282 | A1 | * | 11/2014 | Crum | A47C 1/032 297/259.2 |

FOREIGN PATENT DOCUMENTS

| | | |
|---|---|---|
| JP | 2000-279255 A | 10/2000 |
| KR | 10-0558730 B1 | 3/2006 |
| KR | 10-1640917 B1 | 7/2016 |

* cited by examiner

*Primary Examiner* — Mark R Wendell
(74) *Attorney, Agent, or Firm* — Novick, Kim & Lee, PLLC

(57) ABSTRACT

Provided is an armrest structure for a vehicle seat, and more particularly, an armrest structure for a vehicle seat, which may be operated even though a button is pushed less than a button of a structure in the related art, such that a likelihood of the occurrence of abnormal noise may be reduced because of the reduction in stroke when the button is pushed, and a user may operate the armrest structure with a smaller effort.

5 Claims, 6 Drawing Sheets

ARMREST STRUCTURE FOR VEHICLE SEAT

STATEMENT REGARDING PRIOR DISCLOSURES

The present application claims the grace period exception under AIA 35 USC 102(b) (1) (A) to Korean Patent Registration No. 10-1640917 (published on Jul. 20, 2016), which is hereby incorporated by reference in its entirety.

BACKGROUND OF THE INVENTION

1. Field of the Invention

The present invention relates to an armrest structure for a vehicle seat, and more particularly, to an armrest structure for a vehicle seat, which may be operated even though a button is pushed less than a button of a structure in the related art, such that a likelihood of the occurrence of abnormal noise may be reduced because of the reduction in stroke when the button is pushed, and a user may operate the armrest structure with a smaller effort.

2. Description of the Related Art

A plurality of seats is mounted in high-occupancy vehicles such as buses as well as recreational vehicles (RVs), and as illustrated in FIG. 1A, armrests are mounted at both sides or one side of a seatback 200 of an individual seat 100 among the seats so that an occupant may place his/her arm on the armrest.

The armrest is mounted to be rotatable with respect to the seatback 200 so that the occupant may adjust a height of the armrest to suit the armrest to his/her body size. In general, the occupant may adjust a rotation angle of the armrest by pushing a button 10 or pulling a lever, and may fix the angle by releasing the button 10 or the lever.

A structure in the related art in which the rotation of the armrest is adjusted by pushing the button 10 will be described below. An armrest housing 20 is mounted at one side of the seatback 200 so as to be rotatable about the seatback 200, and the button 10 is mounted at the other end of the armrest housing 20 so as to be able to be pushed. A gas spring 30 (see FIG. 1C) and a bracket 1 are embedded in the armrest housing 20.

As illustrated in FIG. 1B, the gas spring 30 embedded in the armrest is configured such that a piston 32 slides in a cylinder 31 by pressure of gas 37 encapsulated in the cylinder 31. A lockable gas spring is used as the gas spring 30, and the gas spring 30 may be extended and contracted in a longitudinal direction when two chambers 35a and 35b, which are filled with oil 36 and divided at both sides, are in communication with each other by a release pin 33 as a rod 34 is pushed (when the piston is permitted to slide as the gas encapsulated in the cylinder 31 is expanded). The extension and the contraction of the gas spring 30 are stopped by hydraulic pressure in the chambers 35a and 35b when the rod 34 is released (the sliding motion of the piston is inhibited).

The lockable gas spring 30 is widely used for a height and/or angle adjusting device of a general office chair as well as the vehicle seat, and because a detailed configuration and an operating method thereof are publicly known, a description of the detailed configuration and the operational principle will be omitted.

An operating state of the structure in the related art will be described with reference to FIG. 1C. When the occupant pushes the button 10, a rotor 2 is rotated in a direction of the arrow (clockwise in the drawings) in the bracket 1 connected to a front side of the gas spring 30. The rotor 2 has a bent portion 2a being in contact with an end of the rod 34, such that the rod 34 is pushed as the rotor 2 is rotated.

As the rod 34 is pushed, the gas spring 30 may slide (in a direction in which a length of the gas spring 30 is increased) as described above, and the gas spring 30 is extended in the longitudinal direction by pressure of the encapsulated gas. In this case, an end of the gas spring 30 is rotatably connected to a cam 40 fixed to the seatback 200, and as a result, a rectilinear motion of the gas spring 30 is converted into a rotational motion at a point at which the gas spring 30 is connected to the cam 40, and thus the rectilinear motion of the gas spring 30 is converted into a rotational motion of the armrest housing 20. That is, when the button 10 is pushed, the rod 34 is also pushed in conjunction with the button 10, and the armrest housing 20 may be rotated with respect to the seatback 200. Further, elastic force of the gas spring 30 is applied to the armrest housing 20 so that the armrest housing 20 is rotated clockwise or counterclockwise in accordance with a rotation angle of the armrest housing 20 (in accordance with the extended state of the gas spring). When the button 10 is released, the rod 34 is also released, and the extension of the gas spring 30 is stopped, such that the rotation angle of the armrest housing 20 is fixed.

However, the button needs to be pushed deep because of the structure in the related art in which the rotor is rotated in the bracket to press the rod when the button is pushed.

That is, in the related art, there is a problem in that the button needs to be pushed deep because when the button is pushed, the rectilinear motion of the button is converted into the rotational motion for rotating the rotor and then converted into the rectilinear motion for pressing the rod.

SUMMARY OF THE INVENTION

The present invention has been made in an effort to provide an armrest structure for a vehicle seat in which force for pushing a button is converted directly to force for pushing a rod of a gas spring (without going through a rotational motion), thereby reducing a pushing stroke of the button in comparison with a structure in the related art.

An exemplary embodiment of the present invention provides an armrest structure for a vehicle seat, the armrest structure including: an armrest housing which is mounted at one side of a seatback so as to be rotatable about the seatback; a gas spring which is embedded in the armrest housing, and has one end connected to a cam fixed to the seatback, and the other end from which a rod protrudes, such that the gas spring is extended and contracted in length when the rod is pushed, and the extension and the contraction of the length of the gas spring are stopped when the rod is released; a button which has an outer end mounted to be pushed in the armrest housing, and an inner end coupled to a button guide; and a guide member which has one end adjacent to the button guide and the other end disposed adjacent to the rod, and is slidable in a direction perpendicular to the direction in which the button is pushed, in which the button guide has an inclined surface formed at a portion that comes into contact with the guide member, such that when the button is pushed, the guide member slides by being pushed by the inclined surface to push the rod.

A rolling member, which is rotated to reduce frictional force when the guide member comes into contact with the inclined surface, may be mounted on the guide member.

The rolling member may be a roller rotatably mounted on the guide member, or the rolling member may be one or more balls rotatably mounted on the guide member.

One or more protrusions may protrude from an end of the guide member to serve as a stopper for preventing the inclined surface from being withdrawn, and seating grooves in which the protrusions are seated may be formed in the button guide.

According to the present invention having the aforementioned configuration, the rolling member (configured by a roller or a ball) is pushed by the inclined surface formed on the button guide when the button is pushed, such that a rotational motion is not performed, and as a result, a shorter button stroke is implemented in comparison with the structure in the related art (e.g., the button stroke is decreased to 5 mm from 7 mm in the related art).

The amount of pushing the button is reduced as the button stroke is shortened, and as a result, it is possible to inhibit the occurrence of abnormal noise, and the occupant may push the button with a small effort (e.g., required force is decreased to 1.25 kgf or less from 2.5 kgf in the related art).

DETAILED DESCRIPTION OF THE EMBODIMENTS

Figure 1A:
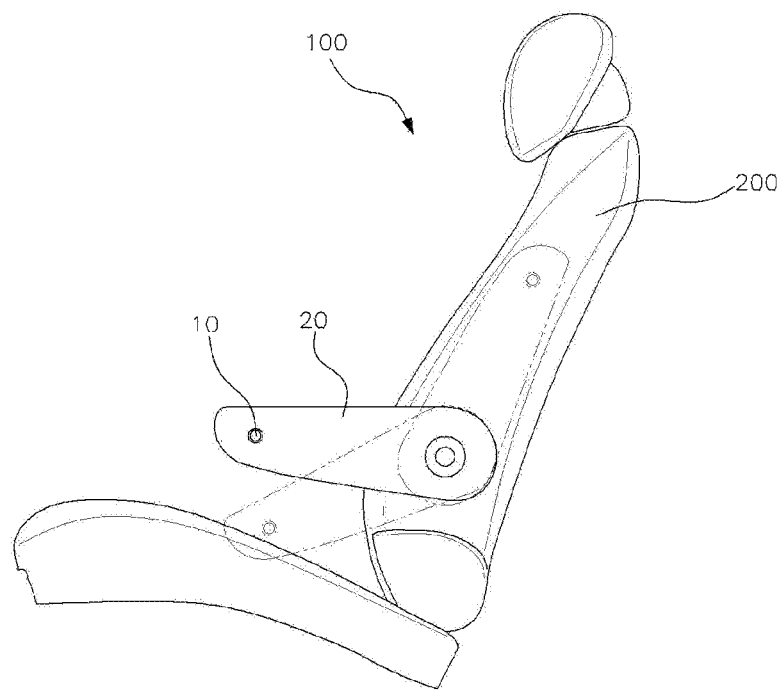
FIG. 1A is a view illustrating a side of a vehicle seat with an armrest mounted on the vehicle seat.
Figure 1B:
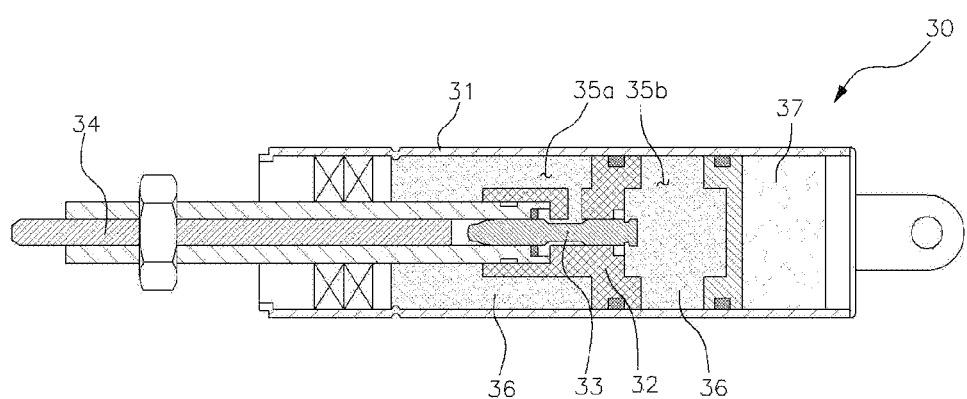
FIG. 1B is a view illustrating a cross section of an interior of a gas spring embedded in the armrest.
Figure 1C:
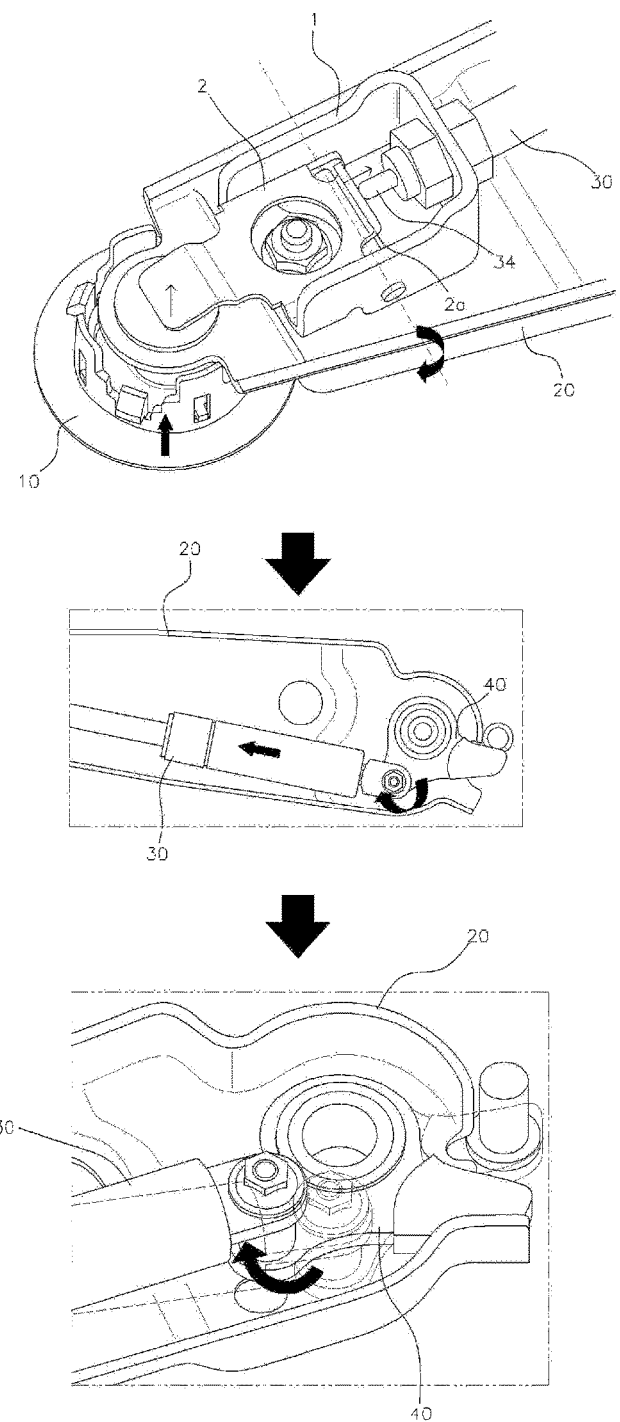
FIG. 1C is a view sequentially illustrating operating states when a button is pushed in a structure in the related art.

Hereinafter, the present invention will be described in detail with reference to the accompanying drawings so that those skilled in the art to which the present invention pertains may easily carry out the present invention. However, the present invention may be implemented in various different ways, and is not limited to exemplary embodiments described herein.

A part irrelevant to the description will be omitted to clearly describe the present invention, and the same or similar constituent elements will be designated by the same reference numerals throughout the specification.

Terms or words used in the specification and the claims should not be interpreted as being limited to a general or dictionary meaning and should be interpreted as a meaning and a concept which conform to the technical spirit of the present invention based on a principle that an inventor can appropriately define a concept of a term in order to describe his/her own invention by the best method.

The present invention relates to an armrest which is rotatably mounted at one side of a seatback 200 of a seat 100 for a vehicle. Similar to the structure in the related art, the armrest of the present invention is configured such that a lockable gas spring 30 is embedded in an armrest housing 20, a rotation angle of the armrest housing 20 may be adjusted when a button 10 is pushed, and the adjusted rotation angle is fixed when the button 10 is released.

Figure 2:
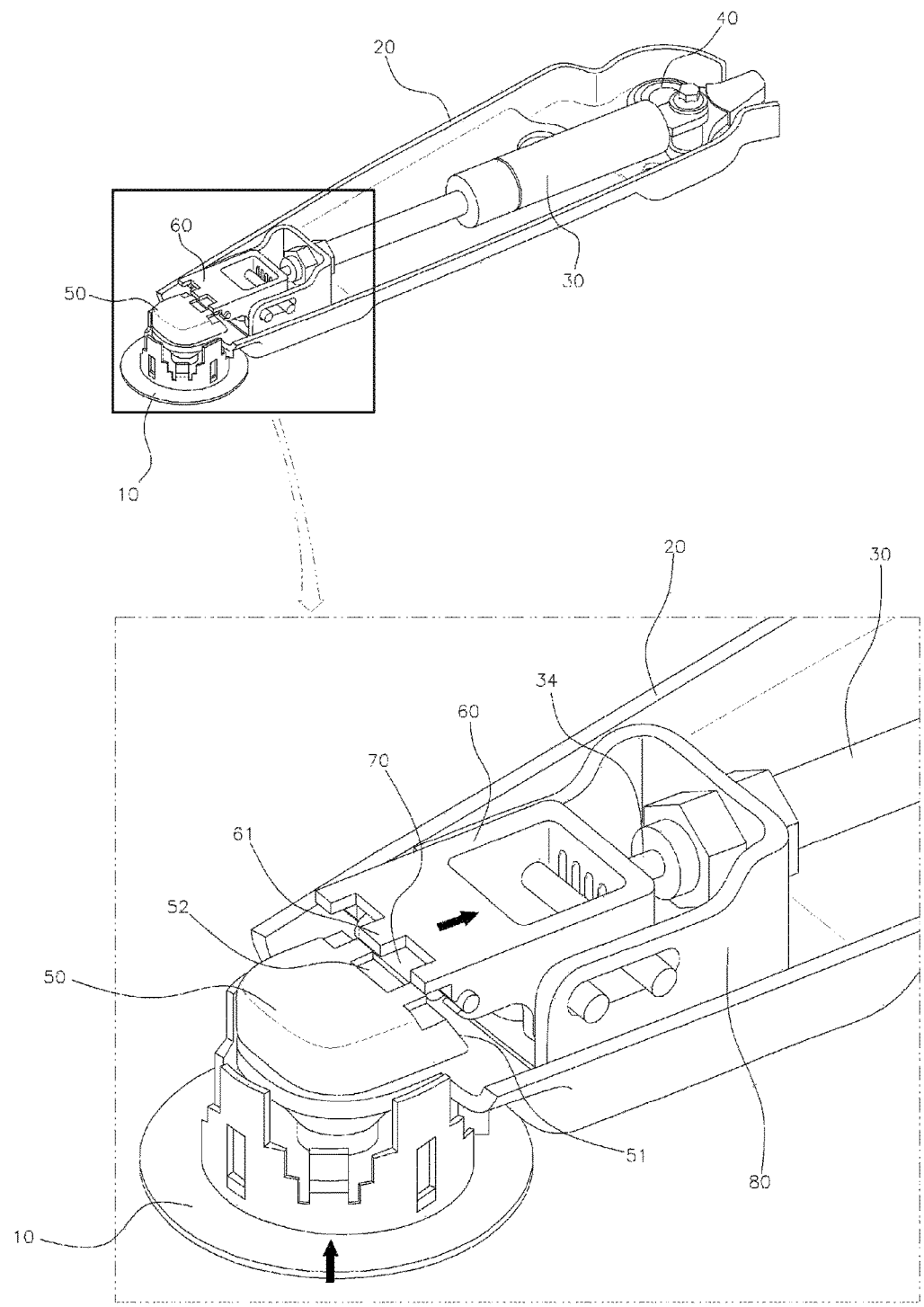
FIG. 2 is a view illustrating an enlarged state in which one side of an armrest housing is disassembled and a button is mounted in an armrest according to an exemplary embodiment of the present invention.
Figure 3:
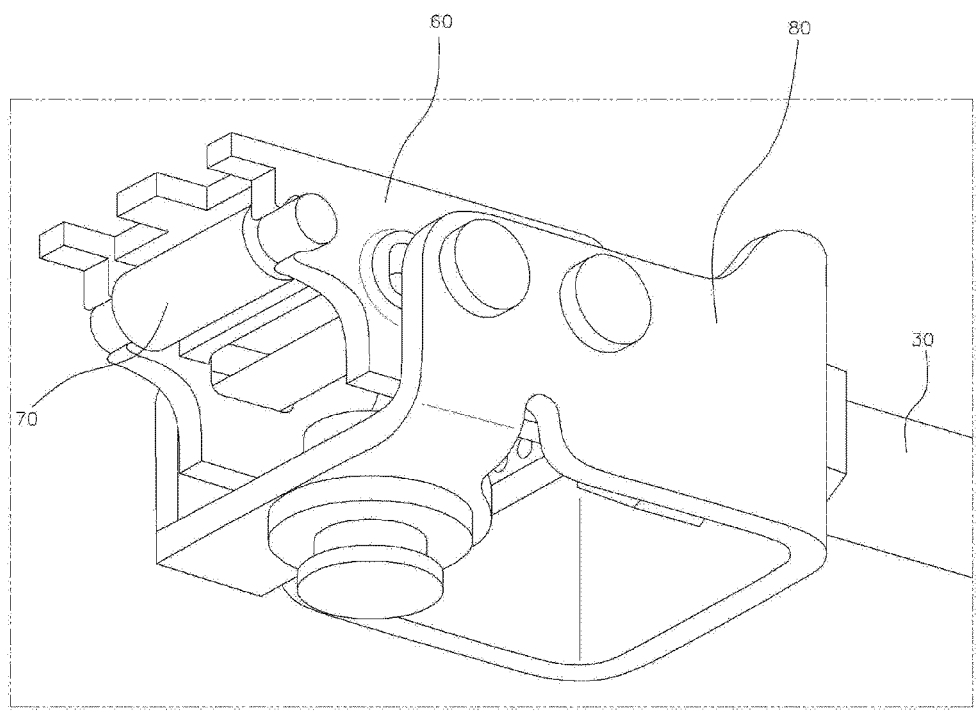
FIG. 3 is a view illustrating a state in which a roller is mounted on a guide member.

Referring to FIGS. 2 and 3, the armrest housing 20 is mounted at one side of the seatback 200 so as to be rotatable the seatback 200, and the button 10 is installed at the other end of the armrest housing 20. The button 10 is mounted such that an outer end of the button 10 may be pushed to a predetermined depth in the armrest housing 20, and a button guide 50 is coupled to an inner end of the button 10.

The gas spring 30 is disposed at a predetermined distance from the button 10. (Similar to the structure in the related art), one end of the gas spring is connected to a cam 40 mounted on the seatback 200, a rod 34 protrudes from the other end of the gas spring, and the gas spring is configured such that the gas spring may be extended and contracted in length when the rod 34 is pushed, and the extension and the contraction of the length of the gas spring are stopped when the rod 34 is released.

A guide member 60 is disposed between the button 10 and the gas spring 30 so that one end of the guide member 60 is disposed adjacent to the button guide 50, and the other end of the guide member 60 is disposed adjacent to the rod 34. The button guide 60 is mounted to be slidable in a direction in which the rod 34 is pushed in a bracket 80 fixed to the armrest housing 20 (i.e., a direction perpendicular to the direction in which the button is pushed).

In the present invention, the button guide 50 has an inclined surface 51 formed at a portion that comes into contact with the guide member 60. Therefore, when the button guide 50 is pushed together with the button 10 (moved upward in a direction of the arrow in FIG. 2), the guide member 70 slides by being is pushed by the inclined surface 51 to push the rod 34.

In this case, a rolling member, which is rotated to reduce frictional force when the guide member 60 comes into contact with the inclined surface 51 of the button guide 50 and is pushed by the inclined surface 51, is mounted on the guide member 60.

Figure 5:
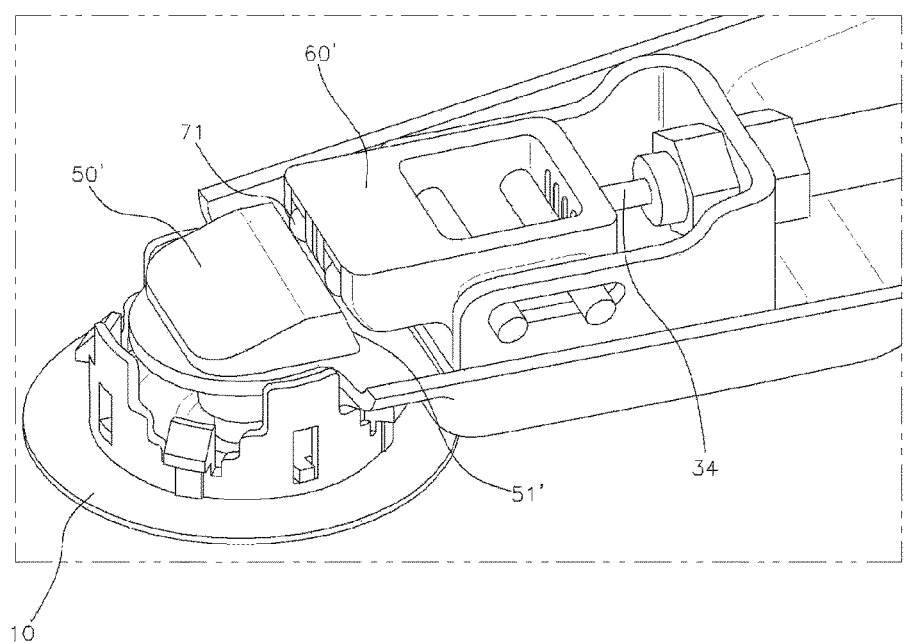
FIG. 5 is a view illustrating a state in which a ball, instead of the roller, is mounted on the guide member according to another exemplary embodiment of the present invention.

As illustrated in FIG. 3, as the rolling member according to the exemplary embodiment of the present invention, a roller 70 may be used, and as another exemplary embodiment, one or more balls 71 may be used as illustrated in FIG. 5.

To allow an end of the guide member 60 to serve as a stopper for preventing the inclined surface 51 from being withdrawn when the button 10 is pushed, one or more protrusions 61 protrude from the end of the guide member 60, and seating grooves 52 in which the protrusions 61 are seated are formed in the button guide 50. The protrusion 61 is configured to be seated in the seating groove 52 when the guide member 60 sufficiently pushes the rod 34.

Figure 4:
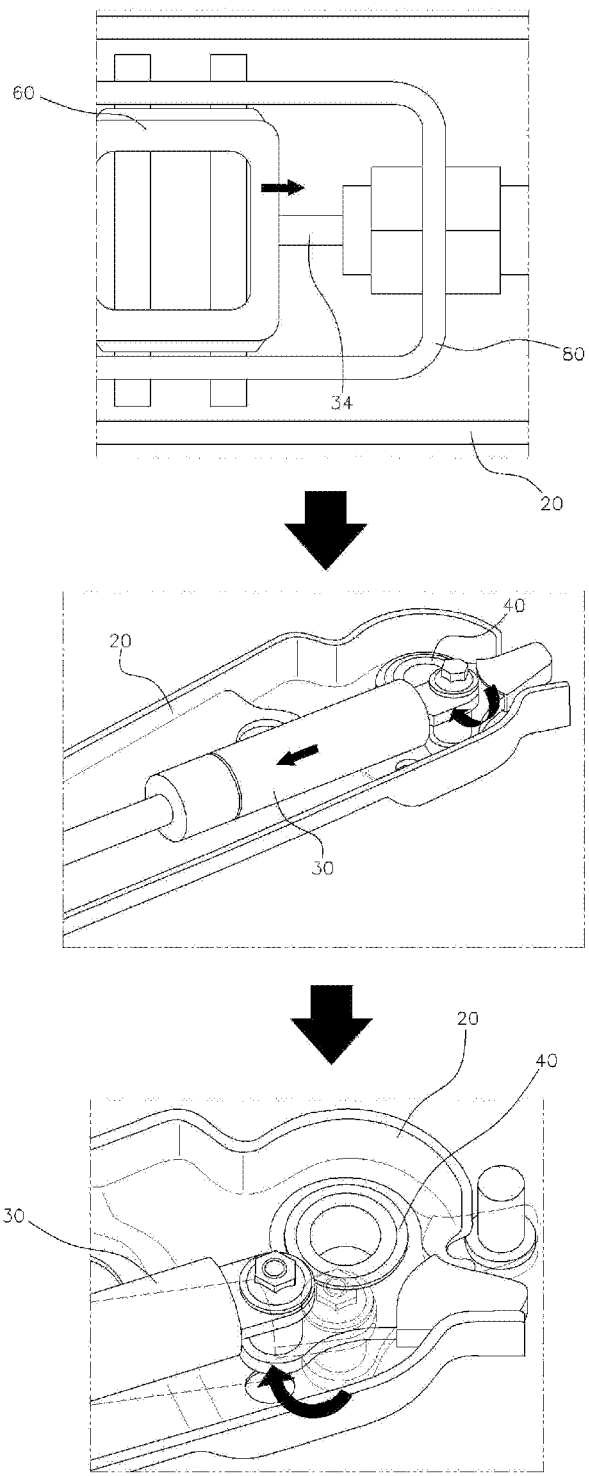
FIG. 4 is a view sequentially illustrating operating states when the button is pushed in the armrest according to the exemplary embodiment of the present invention.

An operational sequence of the armrest according to the present invention, which has the aforementioned configuration, will be described with reference to FIG. 4. The guide member 60 slides in the direction in which the guide member 60 pushes the rod 34 (in the direction of the arrow in FIG. 2) as the occupant pushes the button 10, and when the rod 34 is pushed, the gas spring 30 is extended by pressure of gas in the armrest. At the same time, since one end of the gas spring 30 is connected to the bracket 80 fixed to the armrest housing 20 and the other end of the gas spring 30 is rotatably connected to the cam 40 fixed to the seatback 200, the rectilinear motion of the gas spring 30 is converted into a rotational motion at a point at which the gas spring 30 is connected to the cam 40, and thus the rectilinear motion of the gas spring 30 is converted into a rotational motion of the armrest housing 20.

That is, when the button 10 is pushed, the rod 34 is also pushed in conjunction with the button 10, the armrest housing 20 may be rotated with respect to the seatback 200, and elastic force of the gas spring 30 is applied to the armrest housing 20 so that the armrest housing 20 is rotated clockwise or counterclockwise. Further, when the button 10 is released, the rod 34 is also released, and the extension of the gas spring 30 is stopped, such that the rotation angle of the armrest housing 20 is fixed.

For reference, the armrest according to the exemplary embodiment of the present invention is set such that an angle between a position of the armrest when the armrest is maximally lowered down and a position of the armrest when the armrest is maximally raised up is about 30°, and the seatback 200 is set such that an angle between a position of the seatback 200 when the seatback 200 is maximally tilted forward and a position of the seatback 200 when the seatback 200 is maximally tilted rearward is about 110°. In this case, the armrest is in an upright state (by the seatback tilted rearward) even though the armrest is maximally rotated downward when the seatback 200 is maximally tilted rearward. In this case, when the occupant pushes the button 10 with a smaller effort in comparison with the structure in the related art, the armrest housing 20 is rotatable through the aforementioned operating process, such that when the occupant releases the button 10 at a desired point after rotating the armrest housing to a desired angle, the sliding motion of the gas spring 30 is stopped, and the rotation angle of the armrest housing 20 is fixed.

According to the present invention configured as described above, force for pushing the rod 34 of the gas spring 30 is not converted into an unnecessary rotational motion, but transmitted through a rectilinear motion, and as a result, it is possible to reduce a pushing stroke of the button 10 in comparison with the structure in the related art.

When the button 10 is pushed, the rolling member (configured by a roller or a ball) is pushed by the inclined surface 51 formed on the button guide 50, such that frictional force and the amount of pushing the button 10 are reduced, and as a result, it is possible to inhibit the occurrence of abnormal noise, and the user may push the button with a smaller effort.

The present invention, which has been described above, is not limited by the aforementioned exemplary embodiment and the accompanying drawings, and it will be obvious to those skilled in the art to which the present invention pertains that various substitutions, modifications and alterations may be made without departing from the technical spirit of the present invention.

What is claimed is:

1. An armrest structure for a vehicle seat, the armrest structure comprising:
    an armrest housing which is mounted at one side of a seatback so as to be rotatable the seatback;
    a gas spring which is embedded in the armrest housing, and has one end connected to a cam coupled to the seatback, and another end from which a rod protrudes, such that the gas spring is extended and contracted in length when the rod is pushed, and an extension and a contraction of a length of the gas spring are stopped when the rod is released;
    a button which has an outer end mounted to be pushed in the armrest housing, and an inner end coupled to a button guide; and
    a guide member which has one end adjacent to the button guide and another end disposed adjacent to the rod, and is slidable in a direction perpendicular to another direction in which the button is pushed,
    wherein the button guide has an inclined surface formed at a portion that comes into contact with the guide member, such that when the button is pushed, the guide member slides by being pushed by the inclined surface to push the rod.

2. The armrest structure of claim 1, wherein a rolling member, which is rotated to reduce frictional force when the guide member comes into contact with the inclined surface, is mounted on the guide member.

3. The armrest structure of claim 2, wherein the rolling member is a roller rotatably mounted on the guide member.

4. The armrest structure of claim 3, wherein one or more protrusions protrude from an end of the guide member, and seating grooves in which the protrusions are seated are formed in the button guide.

5. The armrest structure of claim 2, wherein the rolling member is one or more balls rotatably mounted on the guide member.

* * * * *